United States Patent
Song et al.

(10) Patent No.: US 7,502,311 B2
(45) Date of Patent: Mar. 10, 2009

(54) METHOD AND APPARATUS FOR DETECTING A CELL IN AN ORTHOGONAL FREQUENCY DIVISION MULTIPLE ACCESS SYSTEM

(75) Inventors: Seong-Wook Song, Gwacheon-si (KR); Young-Mo Gu, Suwon-si (KR); Min-Goo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 652 days.

(21) Appl. No.: 11/108,071

(22) Filed: Apr. 18, 2005

(65) Prior Publication Data

US 2005/0271026 A1    Dec. 8, 2005

(30) Foreign Application Priority Data

Apr. 16, 2004    (KR) ...................... 10-2004-0026377

(51) Int. Cl.
*H04J 11/00* (2006.01)

(52) U.S. Cl. ..................................... 370/208; 455/456.6

(58) Field of Classification Search ................. 370/210, 370/203, 208, 211, 215, 209; 375/260; 455/440, 455/456.1, 456.6
See application file for complete search history.

(56) References Cited

U.S. PATENT DOCUMENTS

| | | | |
|---|---|---|---|
| 6,597,723 B1 | 7/2003 | Zeira et al. | |
| 7,177,297 B2 * | 2/2007 | Agrawal et al. | 370/342 |
| 7,313,085 B2 * | 12/2007 | Kim | 370/208 |
| 2002/0176483 A1 * | 11/2002 | Crawford | 375/137 |
| 2002/0196766 A1 | 12/2002 | Hwang et al. | |
| 2005/0157637 A1 * | 7/2005 | Feng et al. | 370/203 |
| 2005/0180311 A1 * | 8/2005 | Wang et al. | 370/208 |
| 2005/0201268 A1 * | 9/2005 | Aoki et al. | 370/208 |

FOREIGN PATENT DOCUMENTS

| | | |
|---|---|---|
| EP | 0668664 A1 | 8/1995 |
| RU | 2107393 C1 | 3/1998 |

OTHER PUBLICATIONS

"Cell Search Scheme Embedded with Carrier Frequency Sychronization in Broadband OFDM-CDM Systems" (Masaki Fuji); Global Telecommunications Conference, 2002. Globecom '02. IEEE, vol. 1, Nov. 17-21, 2002 pp. 238-243.

"A preamble-based cell searching technique for OFDM cellular systems" (Kwang Soon Kim; KyungHi Chang; sung Woong Kim; Yong Soo Cho) Vehicular Technology Conference, 2003. VTC 2003-Fall. 2003 IEEE 58TH vol. 4, Oct. 6-9, 2003 pp. 2471-2475.

* cited by examiner

*Primary Examiner*—Ricky Ngo
*Assistant Examiner*—Pao Sinkantarakorn
(74) *Attorney, Agent, or Firm*—Roylance, Abrams, Berdo & Goodman, L.L.P.

(57) ABSTRACT

An apparatus and method are provided for detecting via a mobile station a cell in which the mobile station is located in order to initiate communication in an Orthogonal Frequency Division Multiple Access (OFDMA) system including a plurality of base stations transmitting signal with a pseudo-random noise (PN) code to the mobile station. The apparatus and method include receiving the signal from the base station and performing fast Fourier transform (FFT) on the received signal; generating a PN code for comparison with a base station's PN code included in the signal; and detecting a cell where the mobile station is located by searching for a PN code synchronized in the FFT-processed signal using the generated PN code.

13 Claims, 7 Drawing Sheets

METHOD AND APPARATUS FOR DETECTING A CELL IN AN ORTHOGONAL FREQUENCY DIVISION MULTIPLE ACCESS SYSTEM

PRIORITY

This application claims the benefit under 35 U.S.C. § 119(a) to an application entitled "Method and Apparatus for Detecting a Cell in an Orthogonal Frequency Division Multiple Access System" filed in the Korean Intellectual Property Office on Apr. 16, 2004 and assigned Serial No. 2004-26377, the entire contents of which are incorporated herein by reference.

BACKGROUND OF THE INVENTION

1. Field of the Invention

The present invention relates generally to an Orthogonal Frequency Division Multiple Access (OFDMA) system. In particular, to the present invention relates a method and apparatus for detecting a cell in an OFDMA system.

2. Description of the Related Art

Mobile communication systems have been evolving into a $4^{th}$ generation (4G) mobile communication system providing super high-speed multimedia service, succeeding a $1^{st}$ generation (1G) analog system, a $2^{nd}$ generation (2G) digital system and a $3^{rd}$ generation (3G) IMT-2000 system providing high-speed multimedia service. In the 4G mobile communication system, a subscriber can access all of a satellite network, a local area network (LAN), and an Internet Protocol (IP) network using one mobile station (MS). That is, the subscriber can enjoy voice, image, multimedia, Internet data, voice mail, and instant message (IM) services using one mobile station. The 4G mobile communication system supports a data rate of 20 Mbps for super high-speed multimedia service, and uses an orthogonal frequency like an Orthogonal Frequency Division Multiplexing (OFDM) scheme.

The OFDM scheme, a digital modulation scheme for multiplexing a plurality of orthogonal carrier signals, divides a single data stream into several low-rate streams and simultaneously transmits the low-rate streams using several low-rate subcarriers. As a result, a symbol interval increases, causing a reduction in relative dispersion in a time domain due to multipath delay spread.

An Orthogonal Frequency Division Multiple Access (OFDMA) system transmits data per symbol. Interference occurs between the symbols, and in order to compensate for the intersymbol interference, the OFDMA system inserts a cyclic prefix (CP) which is longer than a transport channel, into the symbol.

Figure 1:
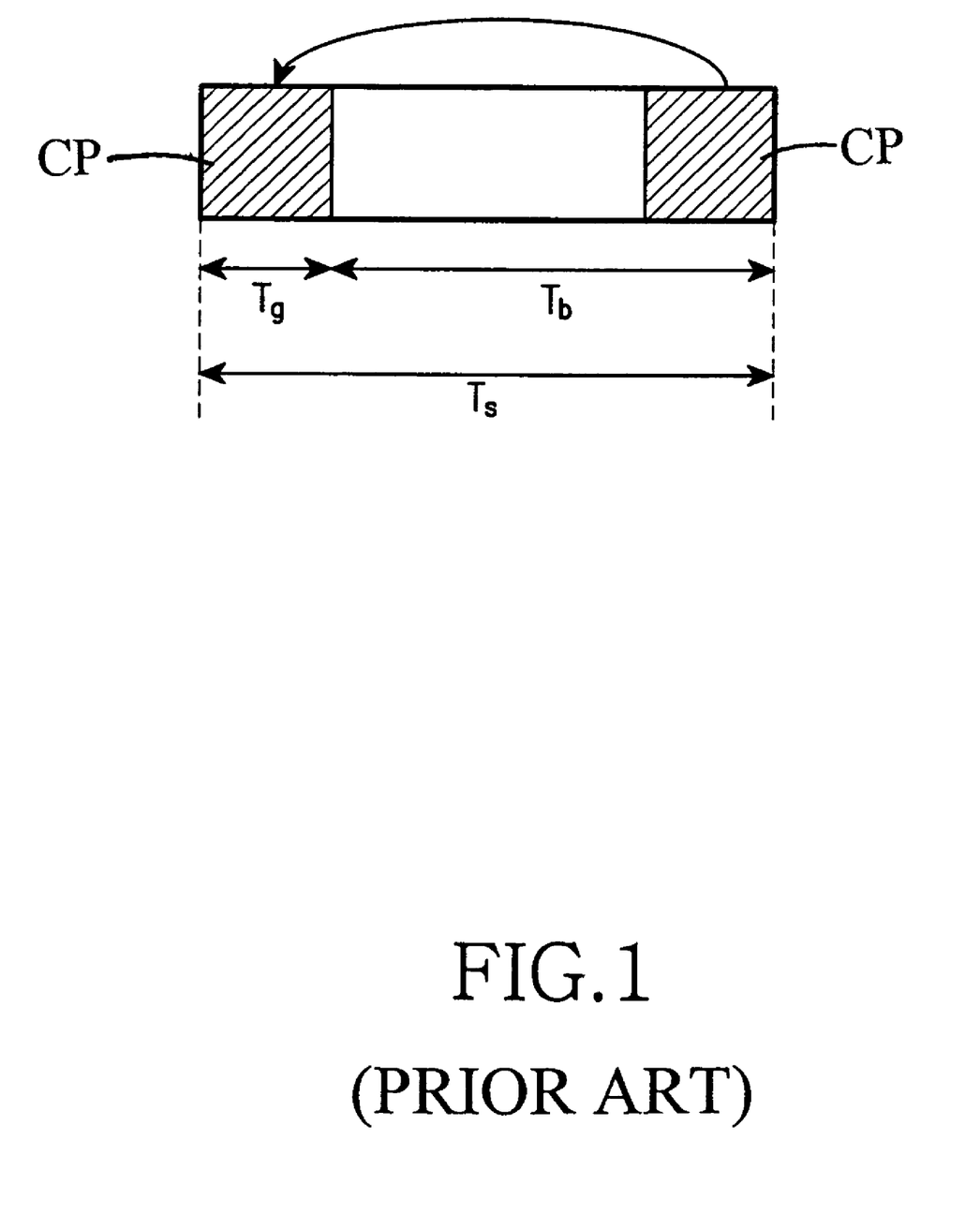
FIG. 1 is a diagram illustrating a conventional symbol structure in an Orthogonal Frequency Division Multiple Access (OFDMA) system.

FIG. 1 is a diagram illustrating a symbol structure in an OFDMA system. Referring to FIG. 1, oblique-lined regions correspond to the CP. A rear part of the symbol is copied and then attached to a front part for a given guide time Tg. Here, a time defined by excluding the CP from the symbol is denoted by Tb, and a time comprising the full symbol is denoted by Ts.

If the number of subcarriers used is denoted by N, a reception signal obtained after CP removing and fast Fourier transform (FFT) has the following relation.

$$z(k) = H(k)s(k) + \omega(k) \quad (1)$$

In Equation (1), s(k) denotes a reception signal in a frequency domain, H(k) denotes a value obtained by performing N-point Discrete Fourier Transform (DFT) on a time-domain channel response h[n], and ω(k) denotes an N-point DFT coefficient for a white Gaussian noise ω[n] and has a dispersion of $N_0$. Herein, [n] and (k) are factors for representing a time-domain signal and a frequency-domain signal, respectively.

A mobile station is required to estimate a channel H(k) in order to demodulate a signal received from a base station (BS), and to this end, the base station inserts pilots in a downlink data packet before transmission. With the use of the pilots, the mobile station not only performs channel estimation but also estimates signal-to-interference and noise ratio (SINR) information useful for power control in a multiple access scheme and transmits the SINR information to the base station.

In a cellular system, a mobile station should detect a cell to which it belongs in order to initiate communication. The cell detection is achieved through unique pseudo-random noise (PN) codes used in each base station and a cross-correlation between mobile station's reception signals. In a Wideband Code Division Multiple Access (WCDMA) system, the cell detection is achieved through a PN code allocated to each cell and a cross-correlation between a primary synchronization channel (P-SCH), a secondary synchronization channel (S-SCH) and a common pilot channel (CPICH) at the beginning of communication. On the other hand, in the OFDMA system, a base station sends a PN code allocated thereto using a preamble inserted at the head of a data frame and a mobile station can detect a cell through cross-correlation. However, the cross-correlation needs $N^2$ multiplications, causing an increase in the number of calculations.

For the frequency-domain data signal of Equation (1), the time-domain reception signal z(k) that a mobile station receives can be represented by the product of a channel frequency response and a frequency-domain transmission signal as expressed in Equation (2).

$$z[n] = h[n] \odot_N s[n] + w[n] \quad (2)$$

where $\odot_N$ denotes N-circular convolution, h[n] denotes a channel response in the time domain, and ω[n] denotes a white Gaussian noise in the time domain.

Based on the relation of Equation (1), equalization or channel estimation is achieved through N efficient divisions. For equalization, particular data s(k) is estimated by dividing z(k) by an estimated value H(k) for H(k). However, for cell detection, s(k) is limited to several particular PN codes and a PN code allocated to a corresponding cell among the PN codes should be detected without an estimated value for H(k). In this case where there is no condition for H(k), it is impossible to detect a cell. However, in the OFDMA system, it is possible to detect a cell on condition that a channel length L in the time domain is very smaller than the number N of OFDM symbol sampling. In general system implementation, however, although information on the channel length L should be given to a mobile station, it is difficult for the mobile station to acquire such information at the beginning of communication.

SUMMARY OF THE INVENTION

It is, therefore, an object of the present invention to provide a method and apparatus for detecting a cell when a channel length L in a time domain is very smaller than the number N of subcarriers in an Orthogonal Frequency Division Multiple Access (OFDMA) system.

It is another object of the present invention to provide a method and apparatus for detecting a cell through circular cross-correlation or circular convolution in a time domain and detecting a cell using fast Fourier transform (FFT) and inverse fast Fourier transform (IFFT) in a frequency domain in an OFDMA system.

To achieve the above and other objects, there is provided a method for detecting by a mobile station a cell in which the mobile station is located in order to initiate communication in an Orthogonal Frequency Division Multiple Access (OFDMA) system including a plurality of base stations transmitting data with a pseudo-random noise (PN) code to the mobile station. The method includes receiving the data from the base station and performing fast Fourier transform (FFT) on the received data; generating a PN code for comparison with a base station's PN code included in the data; and detecting a cell where the mobile station is located by searching for a PN code synchronized in the FFT-processed signal using the generated PN code.

To achieve the above and other objects, there is provided a mobile station's reception apparatus for detecting a cell where the mobile station is located in order to initiate communication in an Orthogonal Frequency Division Multiple Access (OFDMA) system including a plurality of base stations transmitting data with a pseudo-random noise (PN) code to the mobile station. The apparatus includes a fast Fourier transform (FFT) unit for receiving the data from the base station and performing FFT on the received data; and a cell detection unit for generating a test PN code for comparison with a base station's PN code included in the data, searching for a synchronized PN code by comparing the FFT-processed signal with a signal allocated by the generated PN code, and detecting a cell where the mobile station is located using the searched PN code.

BRIEF DESCRIPTION OF THE DRAWINGS

The above and other objects, features and advantages of the present invention will become more apparent from the following detailed description when taken in conjunction with the accompanying drawings in which.

Throughout the drawings, the same element is designated by the same reference numeral or character.

DETAILED DESCRIPTION OF EXEMPLARY EMBODIMENTS

Several embodiments of the present invention will now be described in detail with reference to the annexed drawings. In the following description, a detailed description of known functions and configurations incorporated herein has been omitted for conciseness.

Herein, the present invention provides an algorithm using circular cross-correlation or circular convolution and an algorithm using fast Fourier transform (FFT) and inverse fast Fourier transform (IFFT) for cell detection which is indispensable in an Orthogonal Frequency Division Multiple Access (OFDMA) system, given that a channel length L is very smaller than an Orthogonal Frequency Division Multiplexing (OFDM) symbol length, i.e., the number N of sub-carriers.

In the conventional OFDMA system, as a maximum effective channel length is designed such that it should be limited to a length shorter than a cyclic prefix (CP) length, a preferred embodiment of the present invention implements a cell detection algorithm by considering the CP length as a channel length L.

In the OFDMA system, a base station includes a pseudo-random noise (PN) code allocated thereto in a preamble before transmission to a mobile station. The mobile station detects a cell by obtaining a signal limited to a length L in a time domain by synchronizing a correct test PN code to a PN code of the base station. A structure of a reception apparatus for cell detection for use in the mobile station will now be described in detail with reference to FIG. 2.

Figure 2:
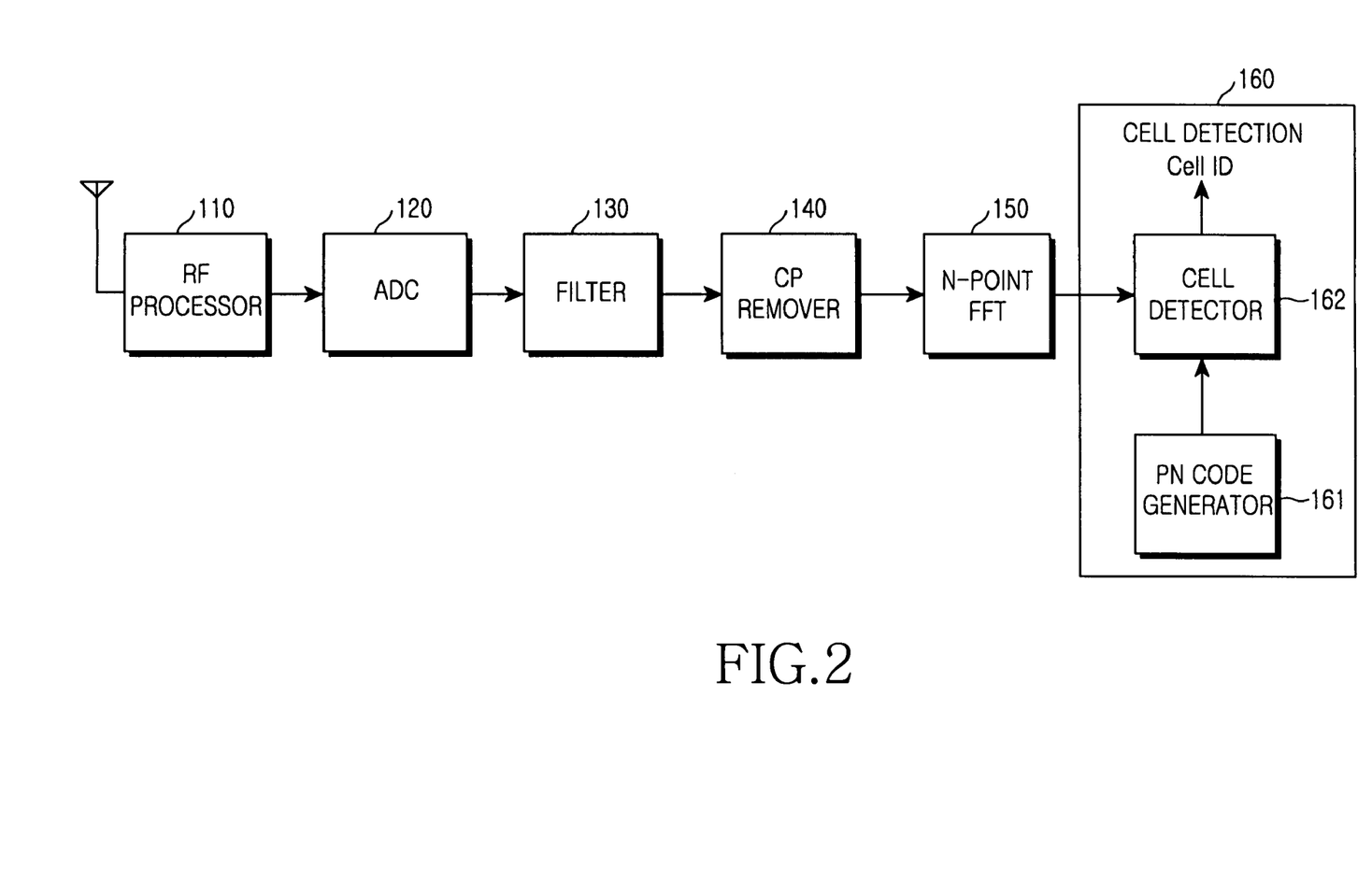
FIG. 2 is a block diagram illustrating a structure of a reception apparatus in an OFDMA system according to an embodiment of the present invention.

FIG. 2 is a block diagram illustrating a structure of a reception apparatus in an OFDMA system according to an embodiment of the present invention. Referring to FIG. 2, the reception apparatus includes a radio frequency (RF) processor 110, an analog-to-digital converter (ADC) 120, a filter 130, a CP remover 140, an FFT unit 150 and a cell detection unit 160.

The RF processor 110 RF-processes a reception signal received from a base station via an antenna, and the ADC 120 converts the reception signal into a digital signal. The filter 130 low-pass-filers the converted digital reception signal for noise cancellation. The CP remover 140 removes a CP inserted in the low-pass-filtered signal, and converts the CP-removed serial signal into a parallel signal. The FFT unit 150 performs N-point FFT on the parallel-converted signal to convert a time-domain signal into a frequency-domain signal. The cell detection unit 160 detects a cell from the FFT-processed signal using a predetermined cell detection algorithm.

The cell detection unit 160 includes a PN code generator 161 for generating a test PN code used for synchronization with a base station's PN code for the reception signal, and a cell detector 162 for performing cell detection according to a predetermined algorithm.

In an OFDM scheme, the use of a plurality of orthogonal carriers increases frequency efficiency and a process of modulating and demodulating a plurality of carriers at a transmitter and a receiver is equivalent to performing inverse discrete Fourier transform (IDFT) and discrete Fourier transform (DFT), respectively. Therefore, IDFT and DFT can be implemented using IFFT and FFT that require Nlog(N) multiplications.

Figure 3:
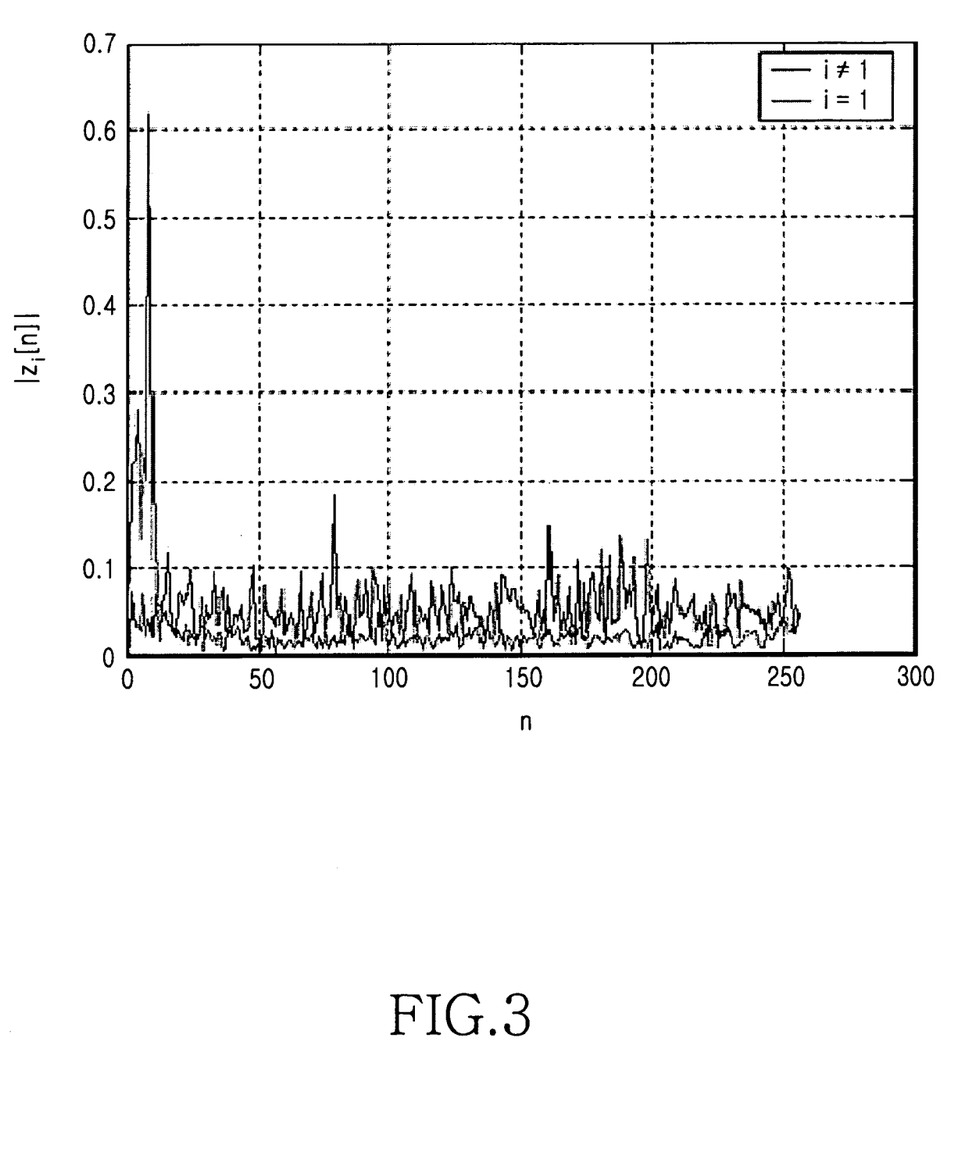
FIG. 3 is a graph illustrating a comparison between a case where synchronization between a base station's pseudo-random noise (PN) code and a test PN code is acquired and another case where the synchronization is not acquired according to an embodiment of the present invention.

FIG. 3 is a graph illustrating a comparison between a case where synchronization between a base station's PN code and a test PN code is acquired and another case where the synchronization is not acquired according to an embodiment of the present invention.

With reference to FIG. 3, a description will now be made of a method for detecting a cell in a frequency domain in an OFDMA system. Assume that $s_i(k)$ unique PN codes (where $i=1,2,\ldots,N_{cell}$) are allocated to each cell, and a mobile station is located in a coverage area of a base station that uses $s_1(k)$ as a PN code for a preamble. A signal $z_i(k)$ determined by dividing a reception signal $z(k)$ by $s_i(k)$ can be expressed as $$z_i(k) = H(k)s_1(k)/s_i(k) + w(k)/s_i(k) \quad (3)$$

Herein, a time-domain signal $zi[n]$ of a cell can be calculated by performing N-point IDFT on $zi(k)$. The $zi[n]$ can be expressed as $$z_i[n] := IDFT(z_i(k)) = IDFT(H(k)s_1(k)/s_i(k)) + IDFT(w_i(k)) \quad (4)$$

Herein, a white Gaussian noise of a cell is $\omega_i(k) := w(k)/s_i(k)$.

The product of N-point DFT coefficients can be expressed with N-circular convolution in the time domain, as shown in Equation (5).

$$z_i[n] = h[n] \odot_N c_{1,i}[n] + w_1[n] \quad (5)$$

Herein, $c_{i,j}[n] = IDFT(s_i(k)/s_j(k))$. Because it is general that for $i \neq 1$, $c_{l,j}(k)$ is equivalent to a PN code, it is spread over the full time band and a signal $h[n] \odot_N c_{l,i}[n]$ determined by circular convolution is also uniformly spread over the full time band.

However, if a base station's PN code is identical to a PN code in test (i=1), $c_{l,1}(k)=1$ and a time-domain signal becomes an impulse ($c[n] = \delta[n]$).

Thus, $z_1[n]$ can be expressed as $$z_1[n] := h[n] + w_1[n] \quad (6)$$

As a channel length L is limited to L<N, Equation (6) can be rewritten as $$z_1[n] = \begin{cases} h[n] + w_1[n] & \text{for } n = 0, 1, \ldots, L-1 \\ w_1[n] & \text{for } n = L, L+1, \ldots, N-1 \end{cases} \quad (7)$$

Therefore, when it is divided by a correct PN code and then IDFT is performed thereon, a signal limited to a length L is obtained in the time domain. However, otherwise, energy is spread over the full time band. As a result, whether or not a test PN code is synchronized can be determined by measuring a dispersion which is a $2^{nd}$ statistical characteristic and comparing the measured dispersion with the test PN code. This can be expressed as Equation (8) and Equation (9):

$$cov[z_i(k)] = N_0 + \sigma_h^2, \text{ for } i \neq 1 \quad (8)$$

$$cov[z_1(k)] = \begin{cases} \dfrac{N}{L}\sigma_h^2 + N_0 & \text{for } k = 0, \ldots, L-1 \\ N_0 & \text{for } k = L, L+1, \ldots, N-1 \end{cases} \quad (9)$$

A cell detection method using dispersion considers a (k>=L) region as a noise region and a (0=k<L-1) region as a channel region, and a dispersion of each region as a criterion for cell detection. A dispersion of the channel region and a dispersion of the noise region can be expressed as Equation (10) and Equation (11), respectively:

$$MEASURE1 := \sum_{n=0}^{L-1} |z_i[n]|^2 \quad (10)$$

$$MEASURE2 = \sum_{n=L}^{N-1} |z_i[n]|^2 \quad (11)$$

The channel region's dispersion MEASURE1 of Equation (10) detects an 'i' value generating a maximum value as a cell, and the noise region's dispersion MEASURE2 of Equation (11) selects a value generating a minimum value as a cell. Herein, the MEASURE1 and the MEASURE2 can be considered as low-band energy and high-band energy in the time domain, respectively. The low-band or high-band energy in the time domain can be approximately calculated using even the output power of a $N_{tap}$ low-band frequency-domain filter $H_{low}(k)$ having a pass band of [0, L−1] or a high-band frequency-domain filter $H_{high}(k)$ having a pass band of [L, N−1]. Therefore, in some cases, a linear $N_{tap}$ Finite Impulse Response (FIR) low-band filter or high-band filter can also be used instead of performing the IDFT or IFFT.

Next, a description will be made of a method for detecting a cell using a dispersion ratio between a channel region and a noise region, i.e., a signal-to-interference and noise ratio (SINR).

The SINR can be expressed as $$SINR := \dfrac{\sum_{n=0}^{L-1} |z_i[n]|^2}{\sum_{n=L}^{N-1} |z_i[n]|^2} \quad (12)$$

With reference to the accompanying drawings, a description will now be made of a method for detecting a cell using the cell detection algorithm in the frequency domain.

Figure 4:
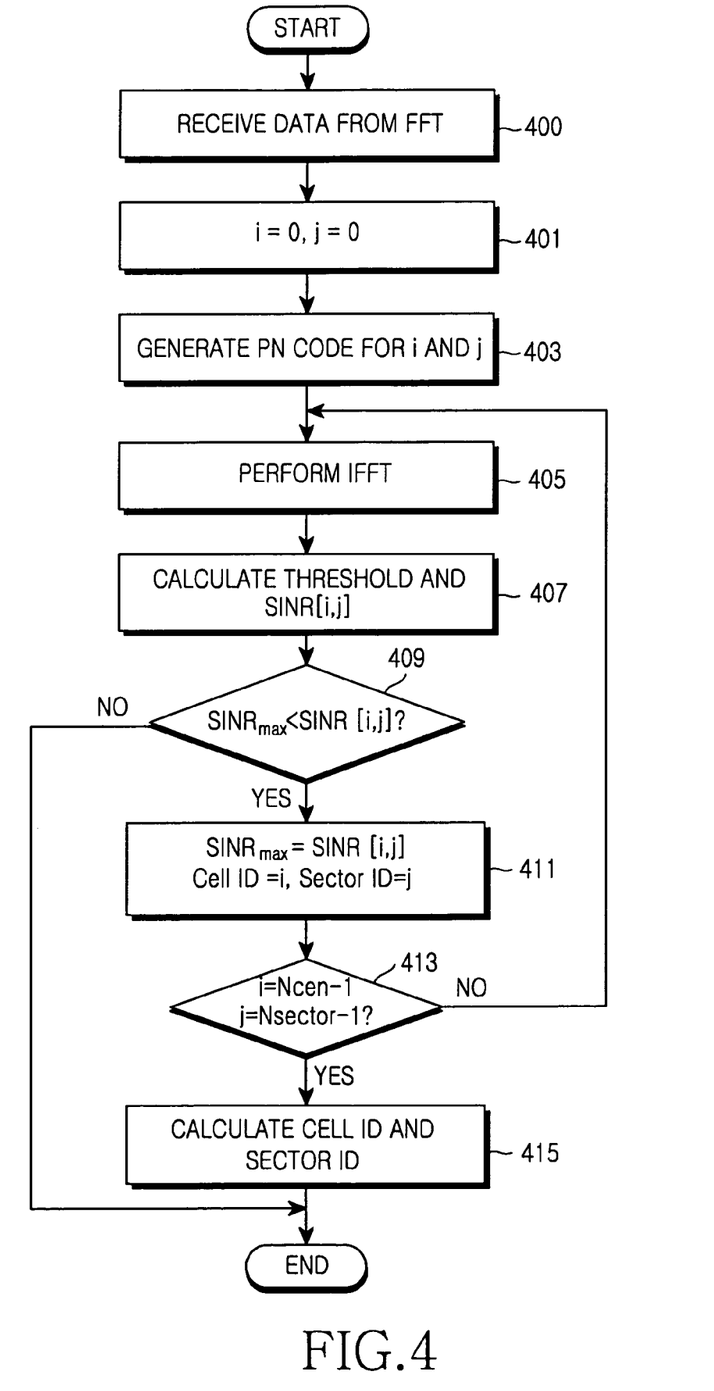
FIG. 4 is a flowchart illustrating a cell detection operation in a frequency domain according to a first embodiment of the present invention.

FIG. 4 is a flowchart illustrating a cell detection operation in a frequency domain according to a first embodiment of the present invention. Referring to FIG. 4, in step 400, a cell detection unit 160 receives data from a FFT unit 150. In step 401, the cell detection unit 160 sets both a cell identifier 'i' and a sector identifier 'j' to 0. In step 403, the cell detection unit 160 generates a PN code corresponding to the cell identifier 'i' and the sector identifier 'j' through a PN code generator 161. The generated PN code is a code used for determining whether it is synchronized with a base station's PN code where a CP is removed from received data. The CP refers to an interval where interference between a current OFDM symbol and an OFDM symbol delayed due to multiple paths occurs. By removing this interval, it is possible to cancel interference between OFDM symbols.

In step 405, the cell detection unit 160 converts a time-domain signal into a frequency-domain signal through IFFT. Because it has been known that a channel length L in the time domain is less than N, it is possible to determine whether or not a PN code is matched by converting a frequency-domain signal to a time-domain signal. If the PN code is matched, a PN code effect from a transmitter disappears and only a channel effect exists. Therefore, if this undergoes IFFT, energy concentrates below L in the time domain. As an alternative method, in step 405, the cell detection unit 160 can occasionally use a linear $N_{tap}$-FIR low-band filter or high-band filter instead of performing IFFT.

Figure 6A:
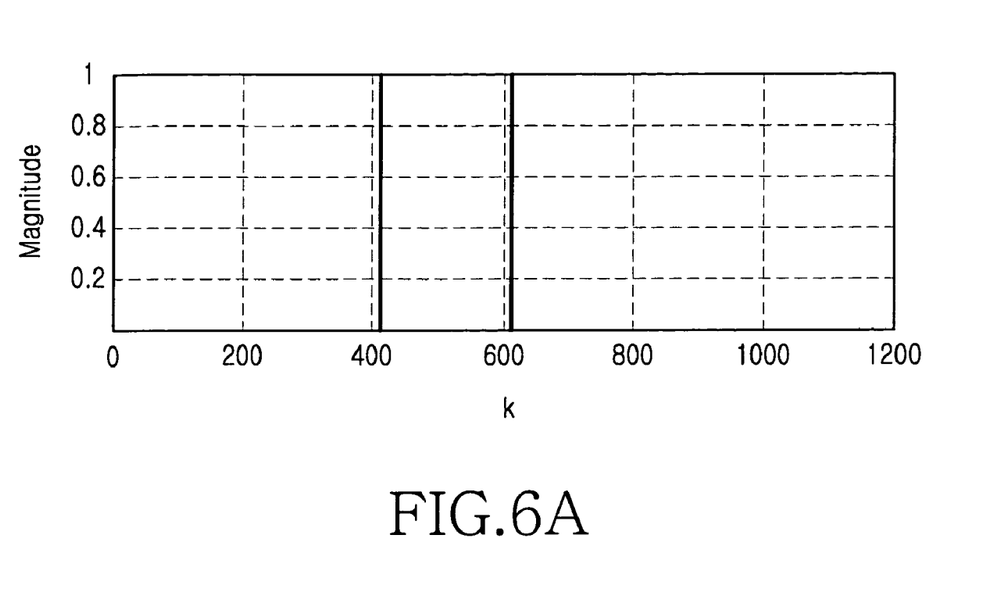
FIGS. 6A and 6B are graphs illustrating a frequency response and a time-domain impulse response of a low-pass filter according to an embodiment of the present invention, respectively.
Figure 6B:
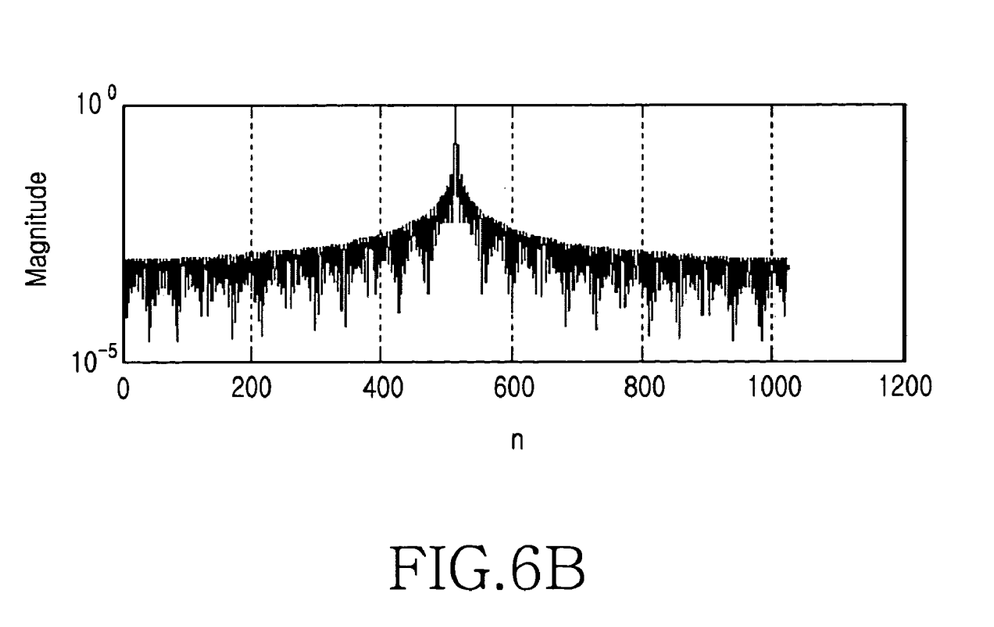

In step 407, the cell detection unit 160 calculates a threshold and a signal-to-interference and noise ratio SINR[i,j] for a corresponding cell and sector. Referring to FIGS. 6A and 6B which are graphs illustrating a frequency response and a time-domain impulse response of a low-pass filter according to an embodiment of the present invention, a channel length is limited to L<<N in the time domain. In an actual system, however, as a guard band exists, a considerable number of subcarriers are unused. Although an actual channel is a 1-tap channel with h[0]=1, central subcarriers are unused as illustrated in FIG. 6A. Therefore, if a reception signal is subjected to IFFT, it shows a spread channel illustrated in FIG. 6B, rather than a 1-tap channel. Thus, in order to estimate a SINR, a signal part should be limited to L. However, the signal part becomes much wider than the interval L due to an influence of the guard band. Therefore, it is necessary to set a value $L_{effective}$(channel effective length) which is slightly greater than L, and calculate a threshold in an energy interval.

In step 409, the cell detection unit 160 compares the calculated signal-to-interference and noise ratio SINR[i,j] with a maximum signal-to-interference and noise ratio $SINR_{max}$. If the calculated signal-to-interference and noise ratio is less than or equal to the maximum signal-to-interference and noise ratio, the cell detection unit 160 ends its operation. However, if the calculated signal-to-interference and noise ratio is greater than the maximum signal-to-interference and noise ratio, the cell detection unit 160 sets in step 411 the calculated signal-to-interference and noise ratio to the maximum signal-to-interference and noise ratio and sets 'i' to a cell identifier and 'j' to a sector identifier. In step 413, the cell detection unit 160 determines whether the cell identifier 'i' corresponds to the last subcarrier number $N_{cell}-1$ of the cell (i=$N_{cell}-1$) and the sector identifier 'j' corresponds to the last subcarrier number $N_{sector}-1$ of the sector (j=$N_{sector}-1$). If the condition of i=$N_{cell}-1$ and j=$N_{sector}-1$ is not satisfied, the cell detection unit 160 returns to step 405 to repeat the foregoing operation. Otherwise, the cell detection unit 160 proceeds to step 415. Herein, it is assumed that the $SINR_{max}$ is −10000000.

In step 415, the cell detection unit 160 calculates a cell identifier and a sector identifier and determines a PN code corresponding to the calculated cell identifier and sector identifier as a correct PN code. Because this PN code is synchronized with the base station's PN code, a cell is detected using the PN code.

Hitherto, the cell detection method using the cell detection algorithm in the frequency domain has been described in the first embodiment of the present invention. Next, a cell detection method using a cell detection algorithm in a time domain will be described in a second embodiment of the present invention.

A cell detection algorithm in a time domain can be effectively implemented using circular cross-correlation rather than general cross-correlation. A description of this cell detection algorithm will be made below.

A correlation between a time-domain signal $s_i[n]$ of a cell and its time delay can be expressed as Equation (13). Assuming that a length N of a frequency domain and a signal $s_i(k)$ have the same size A (PSK signal) and a time-domain signal obtained by performing N-point IDFT thereon is $s_i[n]$, a time-delayed signal si[n-τ] and the signal $s_i[n]$, if a circular cross-correlation therebetween is calculated, are orthogonal with each other:

$$\rho[n] = \sum_{m=0}^{N-1} s_i[m]s_i^*[(m-n)_N] = A^2\delta[n] \quad (13)$$

where $(\ )_N$ denotes modulo N.

Using circular convolution, the circular cross-correlation is written as $$\rho[n] = \sum_{m=0}^{N-1} s_i[m]s_i^*[(m-n)_N] = A^2\delta[n] \quad (14)$$

The circular convolution, as it is expressed as the product of DFT coefficients, can be written as $$\begin{aligned}\rho(k) &:= DFT(\rho[n]) \quad (15)\\ &= DFT(s_i[n])DFT(s_i^*[-n])\\ &= s_i(k)s_i^*(k)\\ &= A^2\\ k &= 0, 1, \ldots, N-1.\end{aligned}$$

Herein, ρ(k) is uniform over the full frequency band, and ρ[n] determined by performing IDFT on the ρ(k) becomes an impulse.

Therefore, using a circular cross-correlation between the time-domain signal z[n] and an appropriate signal $s_i[n]$ or a circular convolution between the time-domain signal z[n] and a signal $s_i^*[-n]$, the following result is given as $$\begin{aligned}z[n] \odot_N s_i^*[-n] &= h[n] \odot_N s_1[n] \odot_N s_i^*[-n] + w[n] \odot_N s_i^*[-n] \quad (16)\\ &= A^2 h[n] + w[n] \odot_N s_i^*[-n],\\ \text{for } i &= 1\end{aligned}$$

As in the case of the frequency domain, if a correct cell PN code is used, energy concentrates within a channel interval by Equation (16). However, if a different PN code is used, energy is uniformly spread over the full band. Therefore, a mobile station can detect a cell using the same criteria as those used in the frequency domain.

With reference to the accompanying drawing, a description will now be made of a cell detection operation using the cell detection algorithm in the time domain.

Figure 5:
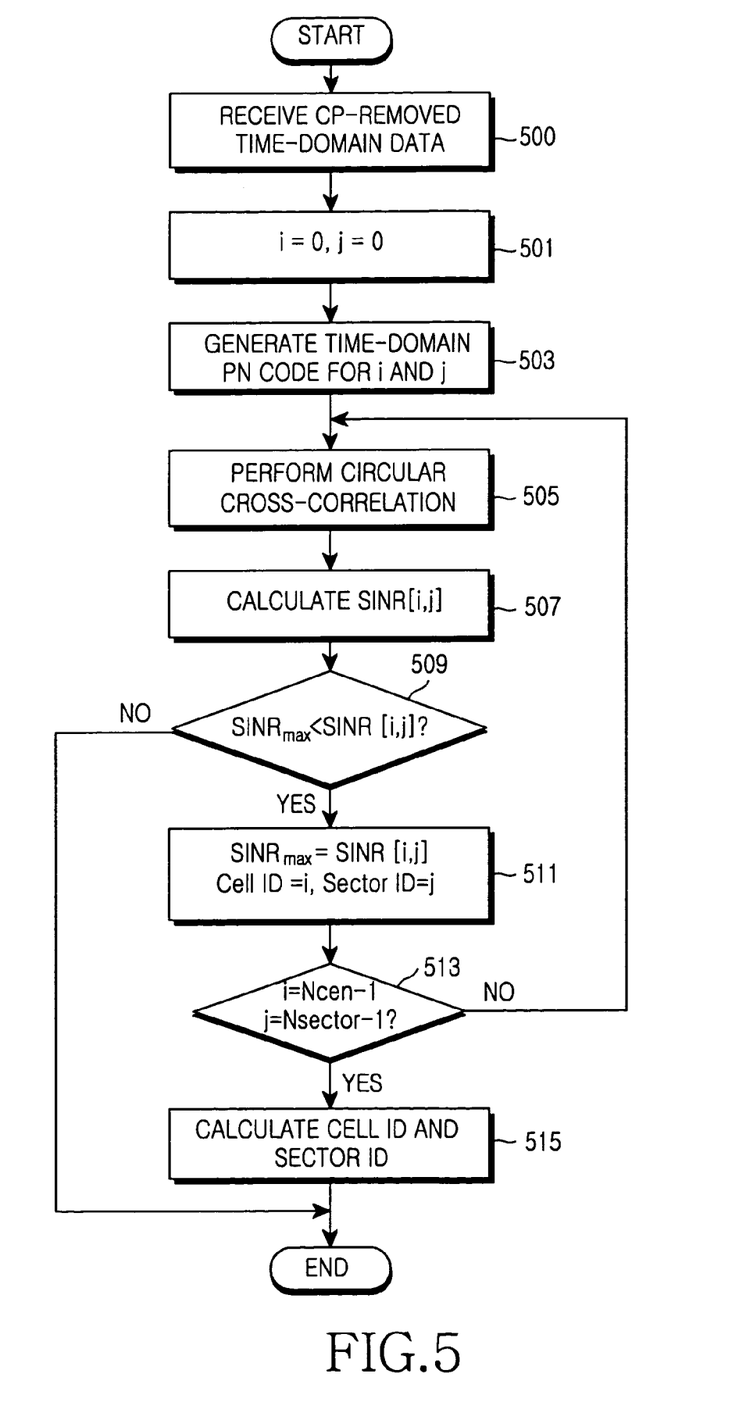
FIG. 5 is a flowchart illustrating a cell detection operation in a time domain according to a second embodiment of the present invention.

FIG. 5 is a flowchart illustrating a cell detection operation in a time domain according to the second embodiment of the present invention. Referring to FIG. 5, a cell detection unit 160 receives CP-removed time-domain data in step 500, and sets both a cell identifier 'i' and a sector identifier 'j' to '0' in step 501. In step 503, the cell detection unit 160 generates a time-domain PN code for the corresponding cell 'i' and sector 'j' through a PN code generator 161. Herein, the generated PN code is a code used for determining whether it is synchronized with a base station's PN code where a CP is removed from received data. The CP refers to an interval where interference between a current OFDM symbol and an OFDM symbol delayed due to multiple paths occurs. By removing this interval, it is possible to cancel interference between OFDM symbols.

The cell detection unit 160 performs circular cross-correlation using Equation (13) to Equation (16) in step 505, and calculates a threshold and a signal-to-interference and noise ratio SINR[i,j] for the corresponding cell 'i' and sector 'j' in step 507. Herein, the threshold is a value appropriately set in an energy interval because a signal component spreads over the full band as illustrated in FIG. 6B due to an influence of the guard band making it impossible to exactly distinguish a signal interval from a noise interval. The threshold setting is possible because it is typical that most energy concentrates within a narrow interval.

In step 509, the cell detection unit 160 compares the calculated signal-to-interference and noise ratio SINR[i,j] with a maximum signal-to-interference and noise ratio $SINR_{max}$. If the calculated signal-to-interference and noise ratio is less than or equal to the maximum signal-to-interference and noise ratio, the cell detection unit 160 ends its operation. However, if the calculated signal-to-interference and noise ratio is greater than the maximum signal-to-interference and noise ratio, the cell detection unit 160 sets in step 511 the calculated signal-to-interference and noise ratio to the maximum signal-to-interference and noise ratio and sets 'i' to a cell identifier and 'j' to a sector identifier. In step 513, the cell detection unit 160 determines whether the cell identifier 'i' corresponds to the last subcarrier number $N_{cell}-1$ of the cell ($i=N_{cell}-1$) and the sector identifier 'j' corresponds to the last subcarrier number $N_{sector}-1$ of the sector ($j=N_{sector}-1$). If the condition of $i=N_{cell}-1$ and $j=N_{sector}-1$ is not satisfied, the cell detection unit 160 returns to step 505 to repeat the foregoing operation. Otherwise, the cell detection unit 160 proceeds to step 515. Herein, it is assumed that the $SINR_{max}$ is −10000000.

In step 515, the cell detection unit 160 calculates a cell identifier and a sector identifier and determines a PN code corresponding to the calculated cell identifier and sector identifier as a correct PN code. Because this PN code is synchronized with the base station's PN code, a cell is detected using the PN code.

The OFDMA system uses $N_G$ subcarriers neighboring a channel as a guide band in order to prevent interference with neighbor channels. The guide band can be modeled on the assumption that a full-band transmission signal arrives at a mobile station passing through an ideal low-pass filter 130 having the guide band as a stop band. Due to an influence of the low-band filter 130, a time-domain channel response signal h[n] and a low-pass filter's time-domain signal g[n] are expressed with N-circular convolution in the time domain, as given by $$z_1[n]=h[n]\odot_N g[n]+w_1[n] \quad (17)$$

Herein, because the ideal low-pass filter is expressed as a sinc function in the time domain, the low-pass filter 130 and $h[n]\odot_N g[n]$ given by circular convolution also appear over the full band in the time domain, making it difficult to distinguish a channel region from a noise region. Even in the case of the cell detection in the time domain, orthogonality of Equation (13) between a PN code's time-domain signal and its delayed time-domain signal is no longer maintained, and as in the cell detection in the frequency domain, a circular cross-correlation signal, related to the sinc function, spreads to the left and right.

In some cases, however, because the sinc function includes most energy within a narrow time band, it is possible to use the foregoing algorithm by appropriately approximating g[n] to a FIR filter.

A frequency-domain response and a time-domain response of the low-pass filter 130 are illustrated in FIGS. 6A and 6B. Herein, FIGS. 6A and 6B illustrate a frequency-domain response and a time-domain response of a low-pass filter for N=1024 and $N_G$=201, in which a time-domain signal is shifted by 512 for clear display of a wave.

Figure 7:
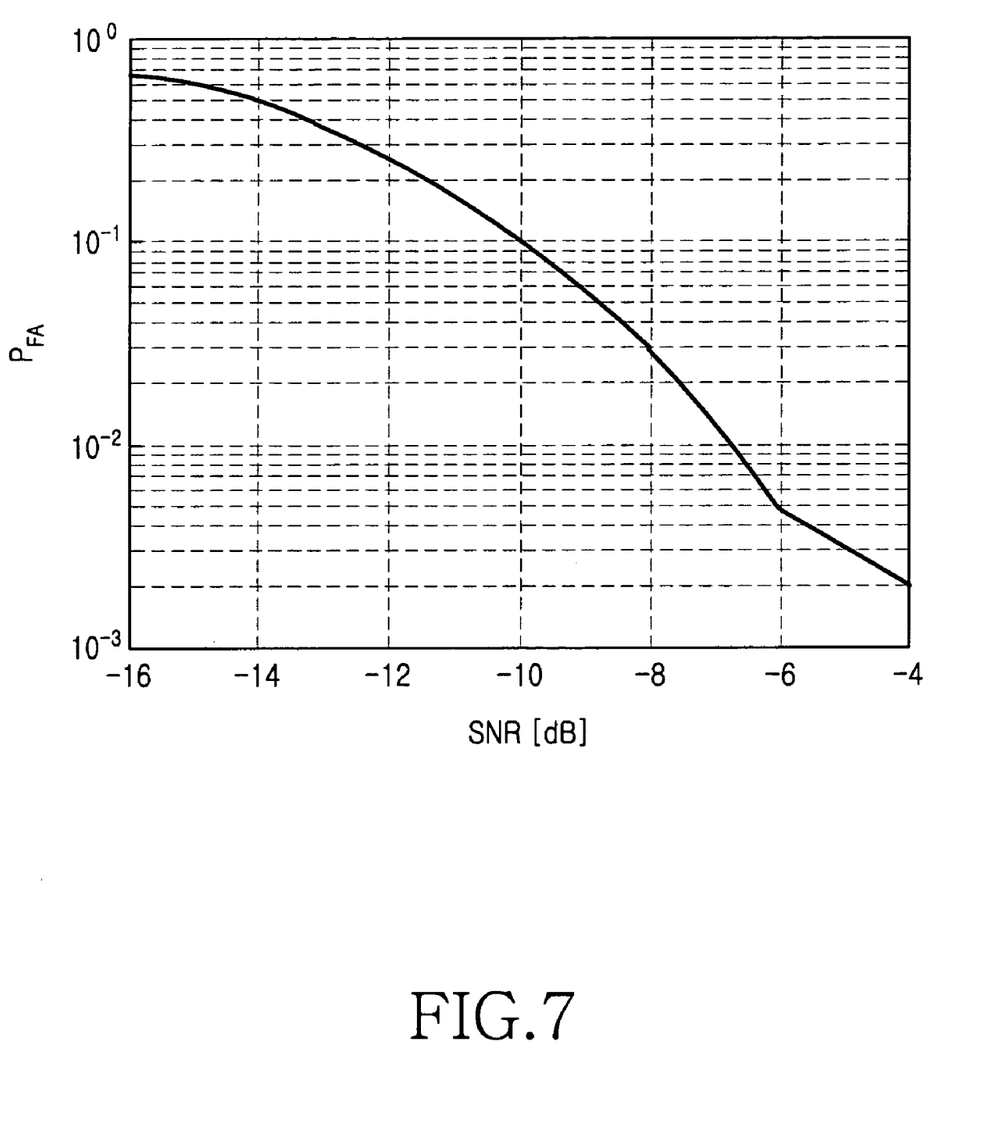
FIG. 7 is a graph illustrating performance of a cell detection algorithm according to an embodiment of the present invention.

FIG. 7 is a graph illustrating performance of a cell detection algorithm according to an embodiment of the present invention. The graph of FIG. 7 was obtained by repeating the same experiment 1000 times for N=256, $N_G$=51, L=8 and $N_{cell}$=32. In the drawing, $P_{FA}$ denotes a false alarm probability.

Referring to FIG. 7, as to the performance of a cell detection algorithm, $P_{FA}$ sharply decreases as a SINR increases.

As described above, in the OFDMA system, the method provided by the embodiments of the present invention takes a CP length as information on a channel length L, uses circular cross-correlation and circular convolution in the time domain, and uses FFT and IFFT in the frequency domain, making it possible to detect a cell even though there is no condition for a frequency-domain channel response signal at the beginning of communication.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for detecting by a mobile station a cell in which the mobile station is located in an Orthogonal Frequency Division Multiple Access (OFDMA) system, the method comprising the steps of:

receiving a signal including a base station's PN code from the base station and performing fast Fourier transform (FFT) on the received signal thereby generating an FFT-processed signal;

generating a test PN code for comparison with the base station's PN code; and detecting a cell where the mobile station is located by searching for a PN code synchronized in the FFT-processed signal using the test PN code using one of a first cell detecting step, a second cell detecting step, and a third cell detecting step;

wherein the first cell detecting step comprises the steps of:

dividing the FFT-processed signal by a signal corresponding to the test PN code thereby generating a divided signal;

performing inverse fast Fourier transform (IFFT) on the divided signal thereby generating an IFFT-processed signal; and determining whether the test PN code is synchronized with a PN code for the IFFT-processed signal, the test PN code being synchronized with the PN code for the IFFT-processed signal when a channel region's dispersion for the IFFT-processed signal is a maximum value;

wherein the second cell detecting step comprises the steps of:

dividing the FFT-processed signal by the signal corresponding to the test PN code thereby generating a divided signal;

filtering the divided signal using a frequency-domain filter to discriminate between a channel region and a noise region thereby generating a filtered signal; and determining whether the test PN code is synchronized with a PN code for the filtered signal, the test PN code being synchronized with the PN code for the filtered signal when a channel region's dispersion for the filtered signal is a maximum value;

wherein the third cell detecting step comprises the steps of:

performing IFFT on the FFT-processed signal to obtain a time-domain comparison signal;

circular cross-correlating the time-domain comparison signal and a time-delayed time-domain comparison signal thereby generating a circular cross-correlated signal; and determining whether the test PN code is synchronized with a PN code for the circular cross-correlated signal, the test PN code being synchronized with the PN code for the circular cross-correlated signal when a channel region's dispersion for the circular cross-correlated signal is a maximum value.

2. The method of claim 1, wherein the test PN code of the first cell detecting step is synchronized with the PN code for the IFFT-processed signal when a noise region's dispersion for the transformed signal is a minimum value, the test PN code of the second cell detecting step is synchronized with the PN code for the filtered signal when a noise region's dispersion for the filtered signal is a minimum value, the test PN code of the third cell detecting step is synchronized with the PN code for the circular cross-correlated signal when a noise region's dispersion for the circular cross-correlated signal is a minimum value.

3. The method of claim 1, wherein whether the test PN code and the base station's PN code of the first cell detecting step are synchronized with each other is determined using a signal-to-interference and noise ratio representative of a ratio of a channel region's dispersion to a noise region's dispersion for the IFFT-processed signal, whether the test PN code and the base station's PN code of the second cell detecting step are synchronized with each other is determined using a signal-to-interference and noise ratio representative of a ratio of a channel region's dispersion to a noise region's dispersion for the filtered signal, whether the test PN code and the base station's PN code of the third cell detecting step are synchronized with each other is determined using a signal-to-interference and noise ratio representative of a ratio of a channel region's dispersion to a noise region's dispersion for the circular cross-correlated signal.

4. The method of claim 1, wherein the cell detection is performed based on a channel length L in the time domain being less than the number N of subcarriers.

5. A mobile station's reception apparatus for detecting a cell where the mobile station is located in an Orthogonal Frequency Division Multiple Access (OFDMA) system, the apparatus comprising:

The RF processor for RF-processing a reception signal including a base station's PN code received from a base station via an antenna;

a fast Fourier transform (FFT) unit for receiving the signal from the base station and performing FFT on the received signal to generate a FFT-processed signal; and a cell detection unit for generating a test PN code to be compared with the base station's PN code, and detecting a cell where the mobile station is located using the test PN code using one of a first cell detecting step, a second cell detecting step, and a third cell detecting step;

wherein the first cell detecting step comprises the steps of:

dividing the FFT-processed signal by a signal corresponding to the test PN code thereby generating a divided signal;

performing inverse fast Fourier transform (IFFT) on the divided signal thereby generating an IFFT-processed signal; and determining whether the test PN code is synchronized with a PN code for the IFFT-processed signal, the test PN code being synchronized with the PN code for the IFFT-processed signal when a channel region's dispersion for the IFFT-processed signal is a maximum value;

wherein the second cell detecting step comprises the steps of:

dividing the FFT-processed signal by the signal corresponding to the test PN code thereby generating a divided signal;

filtering the divided signal using a frequency-domain filter to discriminate between a channel region and a noise region thereby generating a filtered signal; and determining whether the test PN code is synchronized with a PN code for the filtered signal, the test PN code being synchronized with the PN code for the filtered signal when a channel region's dispersion for the filtered signal is a maximum value;

wherein the third cell detecting step comprises the steps of:

performing IFFT on the FFT-processed signal to obtain a time-domain comparison signal;

circular cross-correlating the time-domain comparison signal and a time-delayed time-domain comparison signal thereby generating a circular cross-correlated signal; and determining whether the test PN code is synchronized with a PN code for the circular cross-correlated signal, the test PN code being synchronized with the PN code for the circular cross-correlated signal when a channel region's dispersion for the circular cross-correlated signal is a maximum value.

6. The mobile station's reception apparatus of claim 5, further comprising a cyclic prefix remover for removing a cyclic prefix comprising the base station's PN code inserted by the base station.

7. The apparatus of claim 5, wherein the test PN code is synchronized with the PN code for the transformed signal when a noise region's dispersion for the transformed signal is a minimum value.

8. The apparatus of claim 5, wherein the test PN code is synchronized with the PN code for the filtered signal when a noise region's dispersion for the filtered signal is a minimum value.

9. The apparatus of claim 5, wherein the test PN code is synchronized with the PN code for the circular cross-correlated signal when a noise region's dispersion for the circular cross-correlated signal is a minimum value.

10. The apparatus of claim 5, wherein whether the PN codes are synchronized with each other is determined using a signal-to-interference and noise ratio representative of a ratio of a channel region's dispersion to a noise region's dispersion for the transformed signal.

11. The apparatus of claim 5, wherein whether the PN codes are synchronized with each other is determined using a signal-to-interference and noise ratio representative of a ratio of a channel region's dispersion to a noise region's dispersion for the filtered signal.

12. The apparatus of claim 5, wherein whether the PN codes are synchronized with each other is determined using a signal-to-interference and noise ratio representative of a ratio of a channel region's dispersion to a noise region's dispersion for the circular cross-correlated signal.

13. The mobile station's reception apparatus of claim 5, wherein the cell detection is performed on condition that a channel length L in the time domain is very smaller than the number N of subcarriers.

* * * * *